US011098735B2

(12) United States Patent
Slightam et al.

(10) Patent No.: US 11,098,735 B2
(45) Date of Patent: Aug. 24, 2021

(54) ELECTRICAL POWER ASSISTED DEVICE FOR CONTROLLING AN AERIAL BUCKET WITH A HYDRAULIC MOVEMENT SYSTEM

(71) Applicant: Marquette University, Milwaukee, WI (US)

(72) Inventors: Jonathon E. Slightam, Milwaukee, WI (US); Mark L. Nagurka, Glendale, WI (US); Richard W. Marklin, Jr., Wauwatosa, WI (US)

(73) Assignee: Marquette University, Milwaukee, WI (US)

( * ) Notice: Subject to any disclaimer, the term of this patent is extended or adjusted under 35 U.S.C. 154(b) by 8 days.

(21) Appl. No.: 16/547,068

(22) PCT Filed: Sep. 8, 2017

(86) PCT No.: PCT/US2017/050715
§ 371 (c)(1),
(2) Date: Aug. 21, 2019

(87) PCT Pub. No.: WO2018/156203
PCT Pub. Date: Aug. 30, 2018

(65) Prior Publication Data
US 2020/0080574 A1 Mar. 12, 2020

Related U.S. Application Data

(60) Provisional application No. 62/463,300, filed on Feb. 24, 2017.

(51) Int. Cl.
*F15B 11/20* (2006.01)
*F15B 21/02* (2006.01)

(52) U.S. Cl.
CPC .............. *F15B 11/20* (2013.01); *F15B 21/02* (2013.01); *F15B 2211/41* (2013.01)

(58) Field of Classification Search
CPC ... G05G 9/047; G06F 3/0338; F15B 13/0424; F15B 21/02
See application file for complete search history.

(56) References Cited

U.S. PATENT DOCUMENTS 2,836,467 A 5/1958 Myers
2,946,196 A 7/1960 Myers
(Continued)

FOREIGN PATENT DOCUMENTS

EP 0785168 A2 7/1997
SU 520324 A1 12/1976

OTHER PUBLICATIONS

International Search Report and Written Opinion for International Application No. PCT/US2017/050715 dated Dec. 28, 2017.

*Primary Examiner* — Abiy Teka
(74) *Attorney, Agent, or Firm* — Andrus Intellectual Property Law, LLP

(57) ABSTRACT

Devices for controlling movement of aerial buckets via hydraulic systems. Each hydraulic system has valves that control movement of the aerial bucket. A control head of the device has a joystick that is moveable and encoders that detect movement of the joystick. A valve actuator manifold of the device is coupled between the control head and the hydraulic system and supports valve actuators moveably coupled to the valves. Servo drive systems supported by the valve actuator manifold are coupled to the valve actuators and are controllable to move the valve actuators. A processor module of the device is in communication with the encoders and the servo drive systems. The processor module controls the servo drive systems based on input from the encoders such that moving the joystick controls movement of the aerial bucket.

20 Claims, 10 Drawing Sheets

(56) References Cited

U.S. PATENT DOCUMENTS

| | | |
|---|---|---|
| 3,133,471 A | 5/1964 | Myers |
| 3,301,346 A | 1/1967 | Verrell et al. |
| 3,379,279 A | 4/1968 | Slusher |
| 3,415,021 A | 12/1968 | Myers |
| 3,516,514 A | 6/1970 | Malloy et al. |
| 3,757,895 A | 9/1973 | Knutson |
| 4,113,054 A | 9/1978 | Myers |
| 4,427,121 A | 1/1984 | Clements |
| 4,724,924 A | 2/1988 | Breyer et al. |
| 4,730,543 A | 3/1988 | Holmes |
| 4,762,199 A | 8/1988 | Holmes |
| 5,878,647 A | 3/1999 | Wilke et al. |
| 6,543,578 B1 | 4/2003 | Merz |
| 7,213,502 B2 | 5/2007 | Vonderwell |
| 7,753,077 B2 * | 7/2010 | Bertolasi ............. F15B 13/0424 137/636.2 |
| 8,972,125 B1 | 3/2015 | Elliott |

* cited by examiner

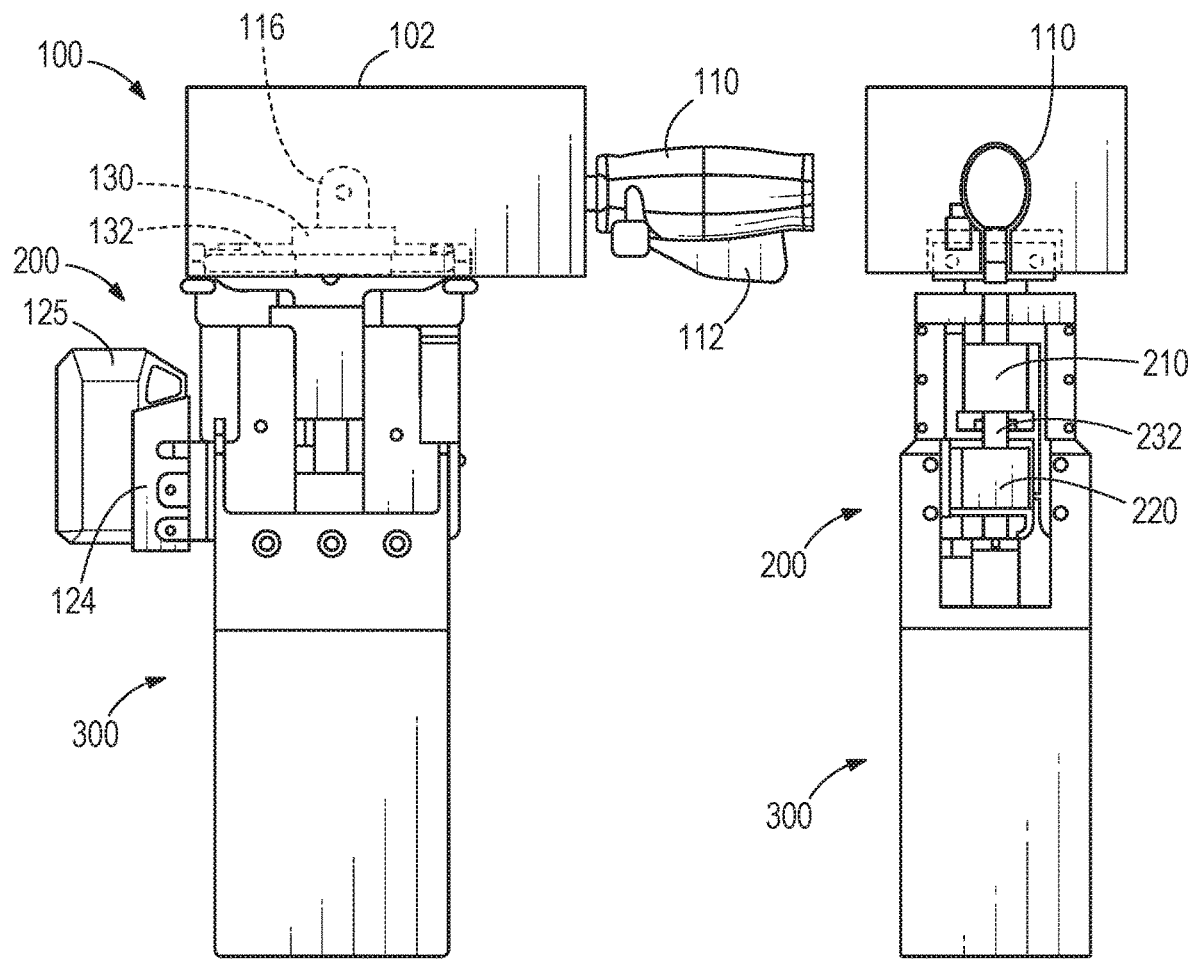
FIG. 8  FIG. 9
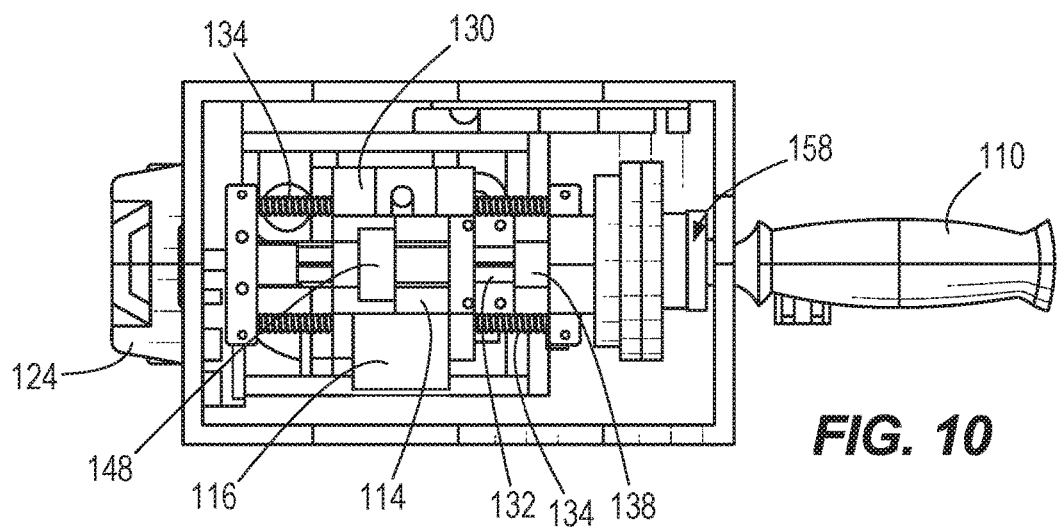
FIG. 10

ELECTRICAL POWER ASSISTED DEVICE FOR CONTROLLING AN AERIAL BUCKET WITH A HYDRAULIC MOVEMENT SYSTEM

CROSS REFERENCE TO RELATED APPLICATIONS

This application claims priority to PCT/US2017/050715, filed Sep. 8, 2017, and published in English on Aug. 30, 2018 as publication number WO 2018/156203, which claims the benefit of U.S. Provisional Patent Application No. 62/463,300, filed on Feb. 24, 2017, the disclosures of which are incorporated herein by reference in their entireties.

FIELD

The present disclosure generally relates to devices for controlling the movement of an aerial bucket and boom system, and more particularly to electrical power assisted devices for moving an aerial bucket and boom in conjunction with a hydraulic system that is activated by the electrical power assisted device.

BACKGROUND

The Background and Summary are provided to introduce a foundation and selection of concepts that are further described below in the Detailed Description. The Background and Summary are not intended to identify key or essential features of the claimed subject matter, nor are they intended to be used as an aid in limiting the scope of the claimed subject matter.

Movable carrier systems such as aerial bucket and boom systems for trucks are utilized in the field to access overhead workspaces. Aerial bucket and boom systems typically include a "bucket" in which a user is positioned. The bucket typically includes control means, such as a hand control or joystick, which the user can actuate to move the bucket upward via extending an "upper boom" and lower boom" and/or to move the bucket rotatably relative to the truck via rotation of an axle attaching the boom system to the truck. Movement in aerial bucket and boom systems typically is achieved via a hydraulic system in which the control means in the bucket actuates hydraulic valves to extend the boom and/or rotate the bucket.

The following U.S. patents relate to control means for movable carrier systems and aerial bucket and boom systems in particular and are incorporated herein by reference.

Control mechanisms for cranes are described in U.S. Pat. No. 2,946,196. In U.S. Pat. No. 2,946,196, a valve mechanism for crane controls having six combined valve-piston units incorporated into a manual control mechanism, referred to as pilot units. A handle is manipulated by an operator, which is movable in opposite directions in three distinct ways. The handle may be rotated right and left about its horizontal axis, fore and aft, in a translating motion, and tilted up and down. Movement in these directions corresponds to movements of the hydraulic pilot units to control a crane.

U.S. Pat. No. 2,836,467 discloses a crane control mechanism, specifically relating to a hydraulic control system for a crane. The hydraulic control system has two pivotally connected booms mounted on a turntable. The control is disposed on the outer end of the upper boom.

U.S. Pat. No. 3,301,346 discloses an early movable personnel carrier system, specifically, a mobile aerial tower of an extensible type where the tower boom may be selectively extended and retracted for adjusting the operating range or reach of the tower. U.S. Pat. No. 3,301,346 also discloses a control mechanism for the extensible tower, which can be operated to cause actuation of powered motor units, for positioning the mobile aerial tower and associated work platform structure on the outer end thereof, to selected positions.

U.S. Pat. No. 3,379,279 discloses a self-propelled mobile unit having a mobile aerial platform used in lifting personnel and equipment. The aerial platform is pivotably mounted to a boom that is actuated via hydraulic controls which are similar if not the same as hydraulic controls in use today on aerial bucket trucks.

U.S. Pat. No. 3,757,895 discloses an aerial lift vehicle having an upper and lower boom similar to those present in most aerial bucket trucks in use today. In the aerial lift vehicle of U.S. Pat. No. 3,757,895, electric controllers are mounted on the end of the upper boom at the bucket and at the base of the boom to operate the main control valves of a hydraulic system.

U.S. Pat. No. 3,516,514 discloses a hydraulically-operated aerial bucket truck, of the type used by electric utility companies for working on overhead lines and poles. The bucket truck of U.S. Pat. No. 3,516,514 includes a manually operable safety control which allows a user, from an elevated position in the aerial bucket, to shut down the hydraulic system by utilizing the pneumatic pressure available in the bucket.

U.S. Pat. No. 3,415,021 discloses a stop valve for a fluid motor provided to raise and lower the boom of an aerial tower. The stop valve is utilized to de-energize the hydraulic system when the boom is fully closed so that the boom does not collide with the truck with a significant amount of energy.

U.S. Pat. No. 4,113,054 discloses a fluid control system for an aerial bucket truck having a pistol grip joystick for control means. The pistol grip joystick disclosed in U.S. Pat. No. 4,113,054 is similar to the joystick used in aerial bucket trucks today. The joystick disclosed in U.S. Pat. No. 4,113,054 includes a pneumatic speed control trigger which is attached to a series of linkages to control pilot valves that actuate the main control valves to move an articulated boom with three degrees of freedom.

U.S. Pat. No. 4,427,121 discloses a hydraulic control system that uses parallel control valve arrangement. Control valves are present at the bucket and control valves are present at the truck and both control valves are configured in an open center arrangement. The control valves that are present at the truck can be used to override the control valves that are present at the bucket.

U.S. Pat. No. 4,724,924 discloses an aerial lift having a pistol grip handle arrangement with respect to a lower boom, an upper boom, and a personnel carrier bucket attached to the upper boom. In U.S. Pat. No. 4,724,924, the pistol grip handle arrangement corresponds to movement by the bucket for all areas of operation.

U.S. Pat. No. 4,730,543 discloses a control system currently used in in aerial bucket trucks having a closed center pilot valve. In U.S. Pat. No. 4,730,543 discloses, a hydraulic fluid pump is connected to a hydraulic cylinder, and the arrangement of the pump and cylinder controls the supply of hydraulic fluid from the pump to the cylinder and controls the supply of hydraulic fluid pressure to a first pilot fluid port and to a second pilot fluid port of a pilot operated control valve to control operation of a pilot operated control valve. U.S. Pat. No. 4,730,543 also discloses a pistol grip control mechanism.

U.S. Pat. No. 5,878,647, discloses solenoid control valves utilized in hydraulic control systems for aerial bucket trucks. A pilot solenoid control valve that uses an electromagnetic coil to activate the pilot valve and control the flow of hydraulic fluid for double acting cylinders.

Although control means for movable carrier systems are known in the art, there is need for improvement. Among other problems, many operators of pistol grip mechanisms for aerial bucket trucks have reported muscle fatigue in the forearm from operating the control. Electric utility operators must wear thick, insulated gloves and leather outer gloves, and the stiffness of these gloves make it more difficult for the operator to manually operate a pistol grip mechanism. Therefore, improvements to control mechanisms for operating aerial bucket trucks are desirable.

SUMMARY

The present disclosure generally relates to a devices and method for controlling movement of an aerial bucket via a hydraulic system. The disclosed devices and methods typically utilize an electrical power assisted hand control unit and a controller which transforms movement of the pistol grip joystick into electronic signals that are sent to servo motors, which in turn control movement of valves of the hydraulic system for moving the aerial bucket.

The disclosed devices are configured for use with hydraulic systems having a hydraulic control manifold with a plurality of valves, where controlling movement of the plurality of valves controls movement of an aerial bucket. The disclosed devices typically include a control head with a joystick that is moveable and the control head typically has a plurality of encoders that detect movement of the joystick. A valve actuator manifold is operatively coupled between the control head and the hydraulic control manifold. A plurality of valve actuators is supported by the valve actuator manifold. The valve actuators are coupled to the plurality of valves and are moveable to control movement of the plurality of valves. A plurality of servo drive systems also are supported by the valve actuator manifold. The servo drive systems are coupled to the plurality of valve actuators and are controllable to move the plurality of valve actuators. A processor module is in communication with the plurality of encoders and the plurality of servo drive systems. The processor module controls the plurality of servo drive systems based on input received from the plurality of encoders such that moving the joystick controls movement of the aerial bucket.

In some embodiments, the device includes a control head with a joystick and a carriage that is slideably engaged with a rail such that the joystick is moveable in forward and rearward directions. Movement of the carriage is perpendicular to movement of the plurality of valve actuators. A control arm of the device has a first end and a second end opposite the first end. The first end is rotatably coupled to the joystick about a twist axis and the second end is pivotably coupled to the carriage. The joystick of the device is rotatable about the twist axis such that the joystick is moveable in clockwise and counterclockwise directions and the second end is pivotable relative to the carriage such that the joystick is moveable in upward and downward directions. The joystick has a centered position and a plurality of bias devices resist movement of the joystick from the centered position. A valve actuator manifold is operatively coupled between the control head of the device and the hydraulic control manifold. A plurality of valve actuators within the valve actuator manifold are coupled to the plurality of valves of the hydraulic system and moveable to control movement of the plurality of valves. A plurality of servo drive systems within the valve actuator manifold of the device are coupled to the plurality of valve actuators and controllable to move the plurality of valve actuators. Each of the plurality of valve actuators has an actuator rod with a rack coupled thereto, and each of the plurality of servo drive systems has a servo motor rotatably coupled to a pinion. The rack of the valve actuators and the pinion of the servo drive systems are configured to mesh such that the plurality of servo drive systems cause movement of the plurality of valve actuators. A battery may be provided and configured to provide electrical power to the plurality of servo motors. A processor module is in communication with the plurality of encoders and the plurality of servo drive systems. The joystick is configured to receive a user force from a user and the user force causes movement of the joystick that is detectable by the plurality of encoders. The processor module is configured to receive input from the plurality of encoders and to control the plurality of servo drive systems based on input received from the plurality of encoders. The plurality of servo drive systems in turn produce a hydraulic control force on the plurality of valves. The hydraulic control force produced by the plurality of servo drive systems exceeds the user force from the user.

The disclosed devices may be utilized in methods for controlling movement of an aerial bucket via a hydraulic system, in which the hydraulic system has a hydraulic control manifold with a plurality of valves and controlling movement of the plurality of valves controls movement of the aerial bucket. The disclosed methods may include coupling a valve actuator manifold to the hydraulic control manifold, where the valve actuator manifold supports a plurality of valve actuators. The method further may include coupling the plurality of valve actuators to the plurality of valves, where the plurality of valve actuators is moveable to control movement of the plurality of valves. The method further includes coupling a plurality of servo drive systems to the plurality of valve actuators, where the plurality of servo drive systems are controllable to move the plurality of valve actuators. The method further may include coupling a control head to the valve actuator manifold, where the control head has a joystick that is moveable, and the control head has a plurality of encoders that detect movement of the joystick. The method further may include connecting a processor module to the plurality of encoders and to the plurality of servo drive systems. The processor module may be configured to control the plurality of servo drive systems based on input received from the plurality of encoders such that moving the joystick controls movement of the aerial bucket.

Various other features, objects and advantages of the disclosure will be made apparent from the following description taken together with the drawings.

BRIEF DESCRIPTION OF THE DRAWINGS

The drawings illustrate the best mode presently contemplated of carrying out the disclosure. The same numbers are used throughout the drawings to reference like features and like components. In the drawings:

FIGS. 8-10 depict side, back, and top views of an embodiment of the control head and linear actuator installed on a hydraulic control manifold known in the prior art;

DETAILED DISCLOSURE

Figure 1:
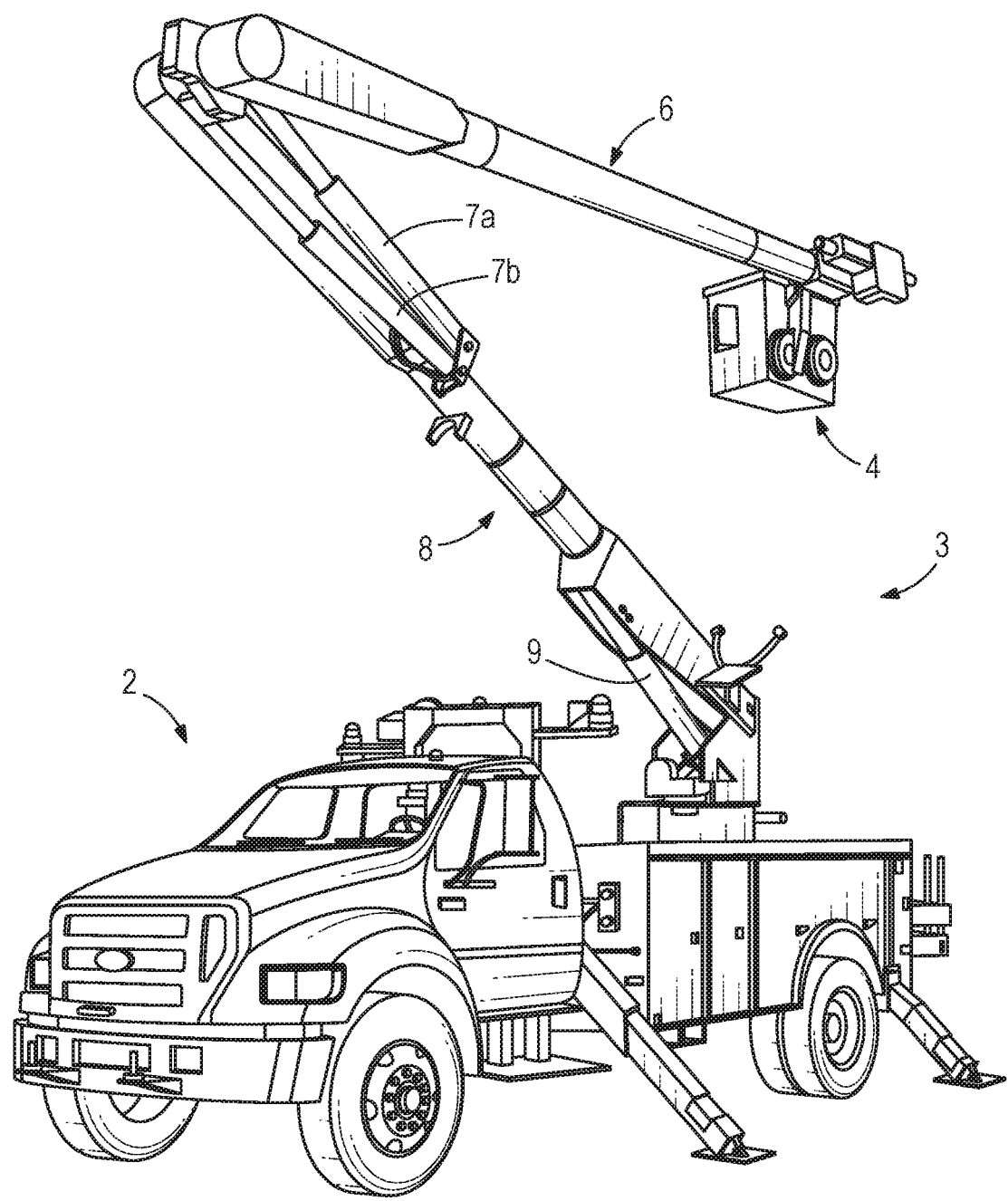
FIG. 1 is an isometric view of a truck supporting an aerial bucket movable by a hydraulic system as known in the art.

This written description uses examples to disclose embodiments of the present application, including the best mode, and also to enable any person skilled in the art to practice or make and use the same. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The subject matter disclosed herein is described using several definitions, as set forth below and throughout the application.

Unless otherwise specified or indicated by context, the terms "a," "an," "plurality" and "the," mean "one or more." For example, "a battery," "a servomotor," and "a valve" should be interpreted to mean "one or more batteries," "one or more servomotors," and "one or more valves," respectively.

As used herein, "about," "approximately," "substantially," and "significantly" will be understood by persons of ordinary skill in the art and will vary to some extent on the context in which they are used.

As used herein, the terms "include" and "including" have the same meaning as the terms "comprise" and "comprising" in that these latter terms are "open" transitional terms that do not limit claims only to the recited elements succeeding these transitional terms. The term "consisting of," while encompassed by the term "comprising," should be interpreted as a "closed" transitional term that limits claims only to the recited elements succeeding this transitional term. The term "consisting essentially of," while encompassed by the term "comprising," should be interpreted as a "partially closed" transitional term which permits additional elements succeeding this transitional term, but only if those additional elements do not materially affect the basic and novel characteristics of the claim.

The devices disclosed herein typically include a "hand control" in which movement of the hand control causes respective movement of an aerial bucket. As used herein, a "hand control" may include a so-called "joystick" and a "pistol grip" as known in the art. The terms "hand control," "joystick," and "pistol grip" may be used interchangeably. Other configurations for hand controls as known in the art are contemplated herein.

Similarly, the presently disclosed devices and methods are configured to engage with hydraulic control manifolds having a variety of valves. These include, but are not limited to, "poppet valves" and "spool valves," which are each shown in further detail in the patents and patent applications incorporated by reference above.

The present disclosure generally relates to an electrical power assisted device for controlling movement of an aerial bucket that is moved by a hydraulic system otherwise known in the art. Maneuverable aerial buckets mounted to trucks are generally known in the art, such as those employed by utilities for maintaining an electric grid, for tree trimming, or for other activities requiring overhead suspension of an operator. Electrical distribution networks, which transmit power from substations to end users (residences and businesses), typically operate at voltages up to 40,000 volts. Many of the lines in a distribution network are overhead, requiring the operators to use trucks with aerial buckets to access these lines. Aerial bucket trucks are medium-sized service vehicles that use booms and a bucket to allow personnel to make repairs and to service power utility equipment.

FIG. 1 depicts a truck with an aerial bucket as known in the art. An aerial bucket is typically located at the end of extension arms, or booms, typically comprising at least two segments. In the embodiment shown, the aerial bucket 4 is supported at one end of an upper boom 6 with the opposite end of upper boom 6 pivotally connected to one end of a lower boom 8. The opposite end of the lower boom 8 is pivotally connected to, and supported, by the truck 2. As known in the art, the aerial bucket 4 is movable via the upper boom 6 and the lower boom 8 through an integrated hydraulic system 3. Specifically, the lower boom 8 is movable relative to the truck 2 by a lower cylinder 9 that is integrated into the hydraulic system 3. Likewise, the upper boom 6 is movable relative to the lower boom 8 via operation of the upper cylinders 7a and 7b, also integrated into the hydraulic system 3. As an anthropomorphic analogy, the aerial bucket 4 is analogous to a hand with the upper boom 6 and lower boom 8 analogous to the forearm and upper arm, respectively. In this regard, the truck 2 is attached to the lower boom 8 in a manner analogous to the shoulder. While not expressly shown, the lower boom 8, in addition to being raised and lowered via a lower cylinder 9 relative to the truck 2, is also rotatable relative to the truck 2. In some embodiments known in the art, the lower boom 8 is rotatable relative to the truck 2 through a series of gears and motors.

As previously stated, aerial buckets known in the art are typically operated using a hydraulic system operating under pressures in the range of 2,500-3,000 psi. The pump for the hydraulic system is typically located under the bed of the truck and is powered by the engine via the power takeoff (PTO) unit, or a battery pack used in conjunction with the engine for hybrid trucks. A dielectric hydraulic oil is pumped throughout the hydraulic system, creating a pressure and flow source that travels through hydraulic hoses.

An operator controls movement of the aerial bucket 4 through movement of a control unit such as a joystick, which mechanically moves valves within a hydraulic control manifold. A low pressure pilot conduit is routed to the hydraulic control manifold, which is typically located at the aerial bucket. The oil pressure within the pilot conduit is typically less than 400 psi. Once the valves (also referred to as pilot valves) are activated by mechanical attachment to the joystick, the low pressure oil actuates main control valves in the hydraulic system, which are typically located at the base of the lower boom. These main control valves then allow for high pressure oil to flow to and from the hydraulic cylinders that actuate and move the booms, aerial bucket, and in some cases trade-specific hydraulic tools. In this regard, actuation of these main control valves allows the aerial bucket to be moved in all degrees of freedom, including moving the bucket up and down, to the left and right, and rotating in a horizontal plane approximately parallel to the ground.

Figure 2A:
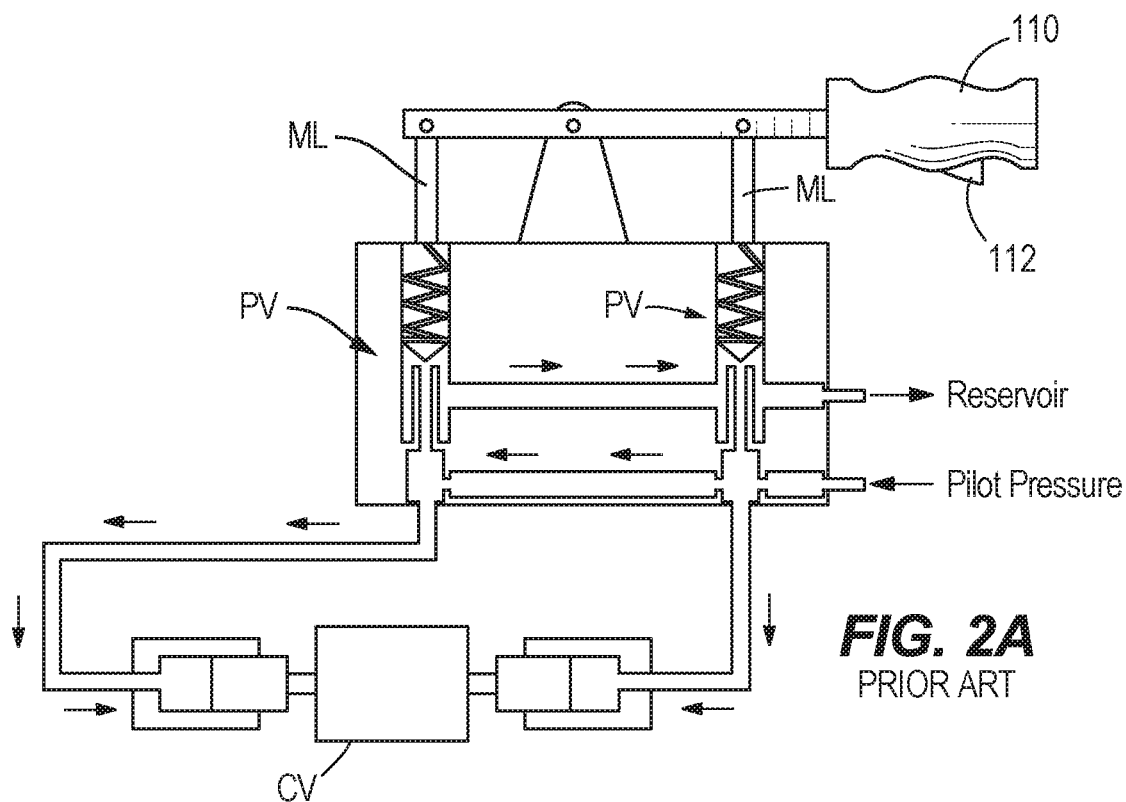
FIGS. 2A-2B are schematic views depicting operation of a joystick for moving an aerial bucket through actuation of a hydraulic control manifold known in the prior art.
Figure 2B:
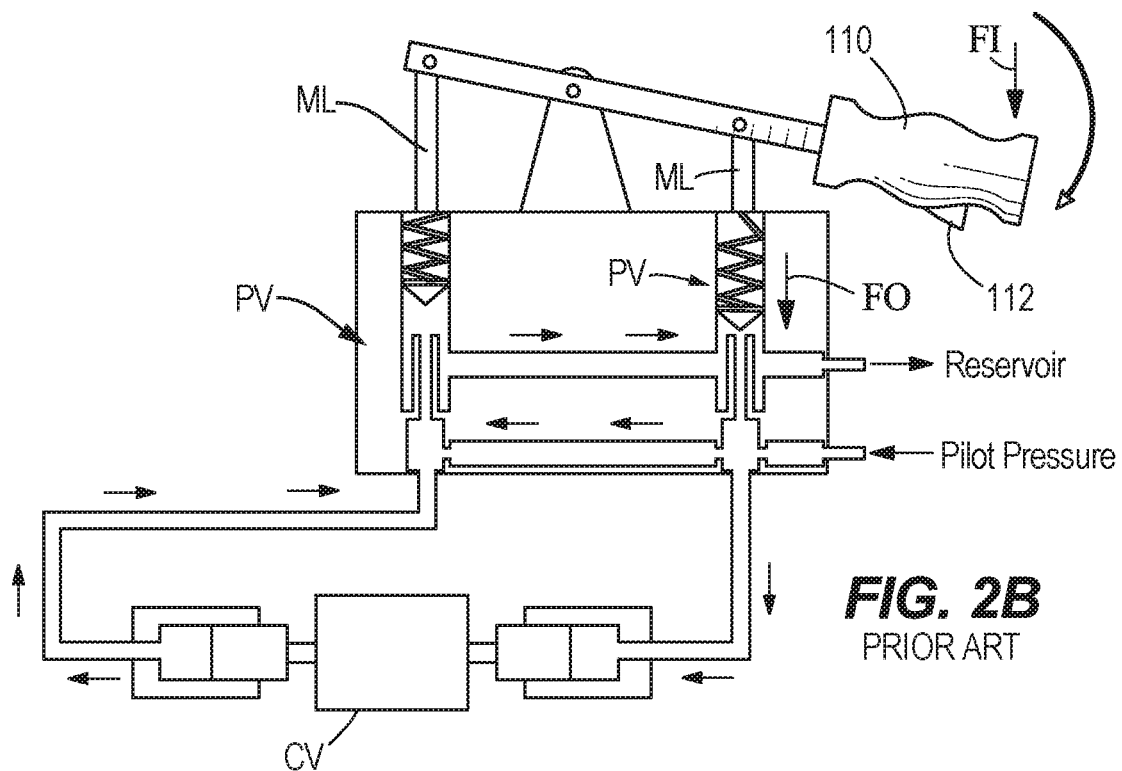

As shown in FIGS. 2A and 2B, a typical control head known in the art mechanically couples the joystick 110 to the pilot valves PV within the hydraulic control manifold. FIG. 2A shows the neutral state in which both pilot valves PV are open such that no pressure builds up in the pilot circuit. FIG. 2B shows an activated state in which the pilot valve PV on the right is closed, thereby applying or directing pilot pressure to the control valve CV. Specifically, the joystick 110 controls the pilot valves PV through a series of mechanical linkages ML. In use, an operator typically grasps the joystick 110 with the right hand using a power grip, much like one grasps a baseball bat. In some cases, a switch 112 (also known as a dead man switch) must be depressed to permit movement of the joystick 110. Once any such switches 112 have been actuated, movement of the joystick 110 causes pilot valves PV to open and close through movements of the mechanical linkages ML therebetween. More information regarding the specific configuration and coupling between the joystick 110 and the pilot valves PV is provided in U.S. Pat. No. 2,946,196.

Once the pilot valves PV are activated, pilot pressures actuate the main control valves CL to provide a flow of high pressure hydraulic fluid to the hydraulic cylinders to move the lower boom, upper boom, and/or to rotate the lower boom at its base. As previously stated, the configuration known in the art permits the operator to move the joystick 110 in six directions or three direction pairs: forward, rearward, upward, downward, clockwise, and counterclockwise (about the longitudinal axis of the joystick). Forward and rearward movement of the joystick 110 rotates the lower boom 8 up and down relative to the truck 2, respectively. Tilting the joystick 110 up or down relative to the ground raises and lowers the upper boom 6 relative to the lower boom 8, respectively. Twisting the joystick 110 clockwise and counterclockwise rotates the aerial bucket 4, along with the upper boom 6 and lower boom 8, within a horizontal plane to the right or left, respectively.

Figure 3:
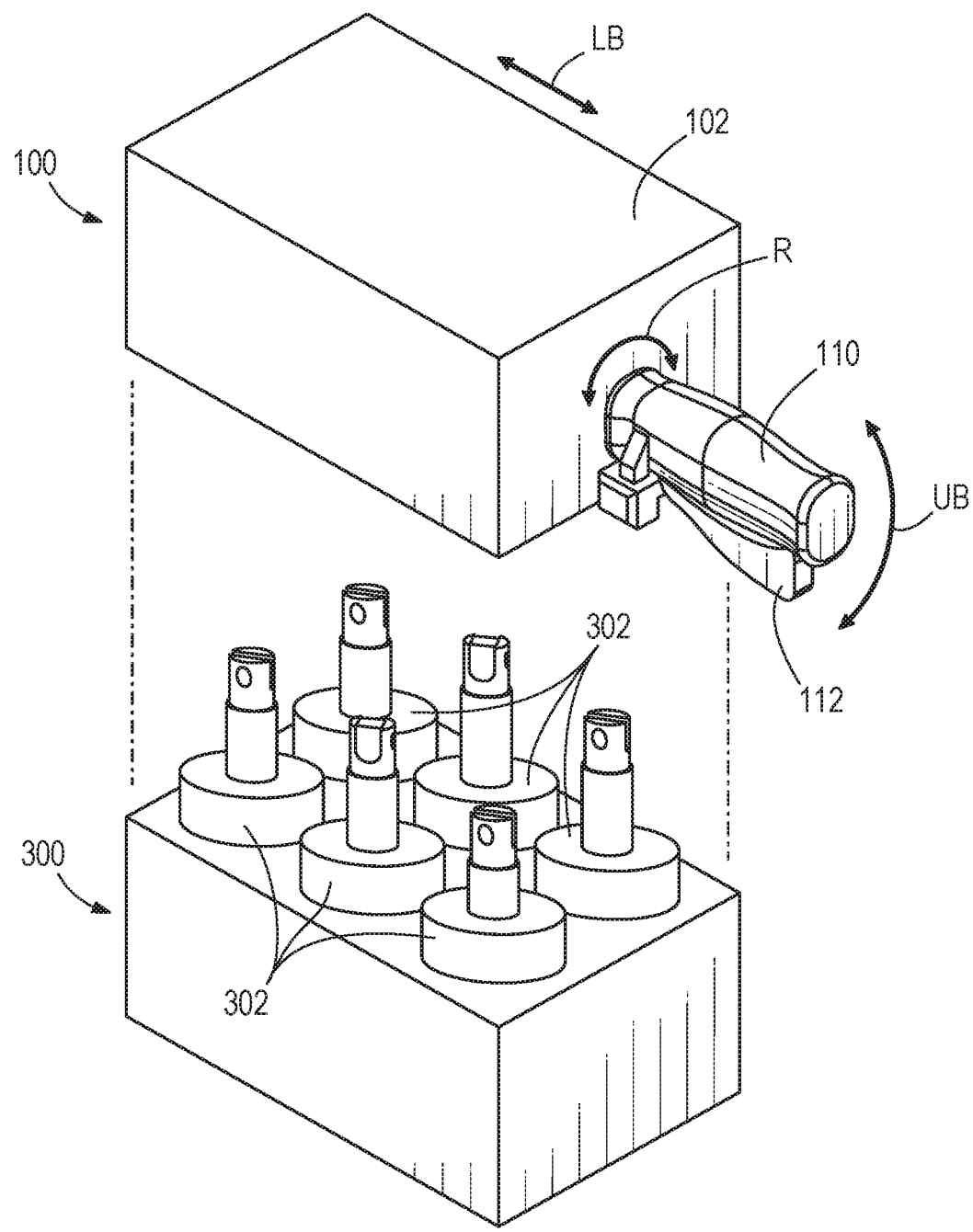
FIGS. 3 and 4 are isometric views depicting the presently disclosed device in conjunction with a hydraulic control manifold known in the prior art.

As previously stated, each of these motions is independently controllable by movement of pilot valves PV (which as stated above may be a poppet valve or spool valve) up and down. FIG. 3 shows a typical hydraulic control manifold 300 comprising valves 302, which are opened and closed by moving the valves 302 into or out of the hydraulic control manifold 300. In the embodiment shown, the valves 302 are comprised of six poppet valves. However, in embodiments configured to engage with a hydraulic control manifold 300 having spool valves, it should be recognized that the valves 302 are comprised of three spool valves.

In the presently disclosed devices and methods, the valves 302 are not moved by mechanical linkages ML as presently known in the art, but through valve actuators 230, which will be discussed in greater detail below.

The present inventors have identified through experimentation and testing that the joysticks used in conventional aerial buckets suffer from many shortcomings. Joysticks known in the art are very difficult to use, particularly in the high-voltage environments of line service operators. Specifically, these operators must wear thick rubber gloves consisting of two parts for their protection: a rubber inner glove that is rated for electrical protection of at least 10,000 volts, and a leather outer glove that protects the rubber glove from puncture. The thickness and stiffness of the gloves makes it more difficult for the operator to manually operate the joystick.

Moreover, presently known joysticks require a substantial application of force to operate. This in turn may lead to substantial muscle fatigue, such as in the forearm, repetitive stress injuries, and a limitation on who may work as an operator. Field tests of the hand and forearm force, and muscle exertions required thereof, demonstrate that movement of the joystick presently known in the art increase the risk of muscle fatigue and possibly repetitive stress injuries during use of the device. These findings have been corroborated by anecdotal reports from line workers, many of whom must operate the joystick for sixty seconds or more at a time, multiple times a day.

The present inventors have developed the presently disclosed devices and methods to substantially reduce the force required to operate aerial buckets, including those already in service that use hydraulic systems. In other words, the present disclosure is applicable to both new aerial bucket trucks, and retrofitting for existing aerial bucket trucks, to substantially reduce the force required to operate conventional hydraulic systems.

FIG. 3 shows a control head 100 in accordance with the present disclosure, superimposed over a conventional hydraulic control manifold 300. As previously stated, the hydraulic control manifold 300 has a series of valves 302 that are manipulatable to ultimately move the aerial bucket 4 (shown in FIG. 1) through a conventional hydraulic system 3 known in the art. The control head 100 is specifically designed to move in the same manner as control heads known in the art, specifically in the forward and rearward directions, as designated by the arrow LB (through movement of the lower boom 8), tilting of the joystick 110 in the upward and downward directions as designated by the arrow UB (through movement of the upper boom 6), and rotation of the joystick 110 in the clockwise and counterclockwise directions as designated by the arrow R (through rotation of the lower boom 8 relative to the truck 2 within the horizontal plane parallel to the ground). In the embodiment shown, the control head 100 also includes a switch 112 to prevent accidental movement of the joystick 110, leading to accidental and potentially dangerous movement of the aerial bucket 4.

In certain embodiments, the control head 100 is also substantially the same size as those known in the art, permitting retrofittability and a familiar setup for the operator. However, it should be known that the size, shape, and configuration of the control head 100 can be modified for further improvements, including alternative, more ergonomic joystick orientations.

Figure 4:
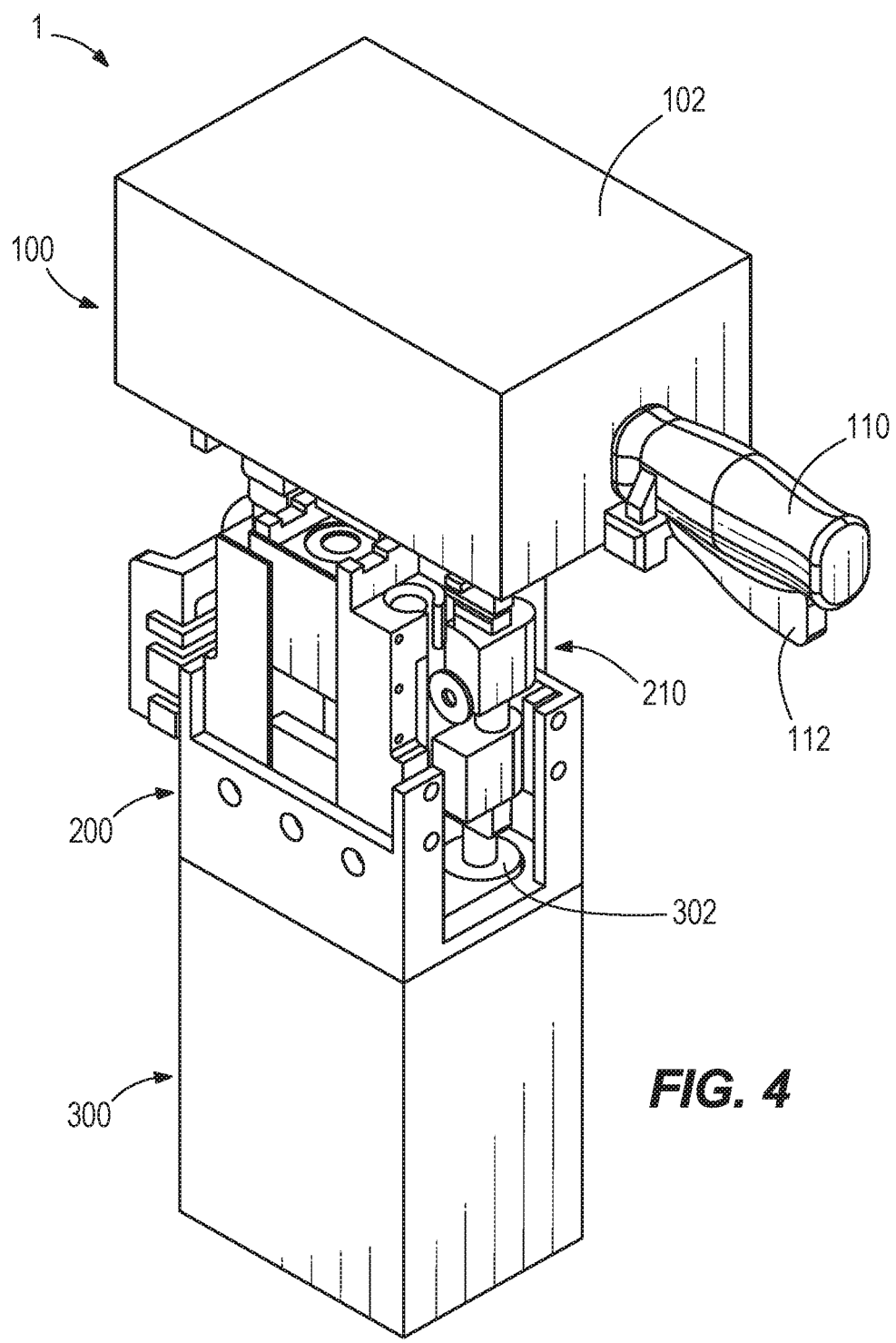

FIG. 4 shows one embodiment of an electric force assisted device 1 in the present disclosure that includes the control head 100 shown in FIG. 3, but also shows a valve actuator manifold 200 coupled between the hydraulic manifold 300 and the control head 100 as would be implemented in practice. As will be discussed further below, the valve actuator manifold 200 includes a series of servo drive systems 210 that cause movement of the valves 302 to correspondingly actuate the hydraulic system 3 (previously shown).

Figure 5:
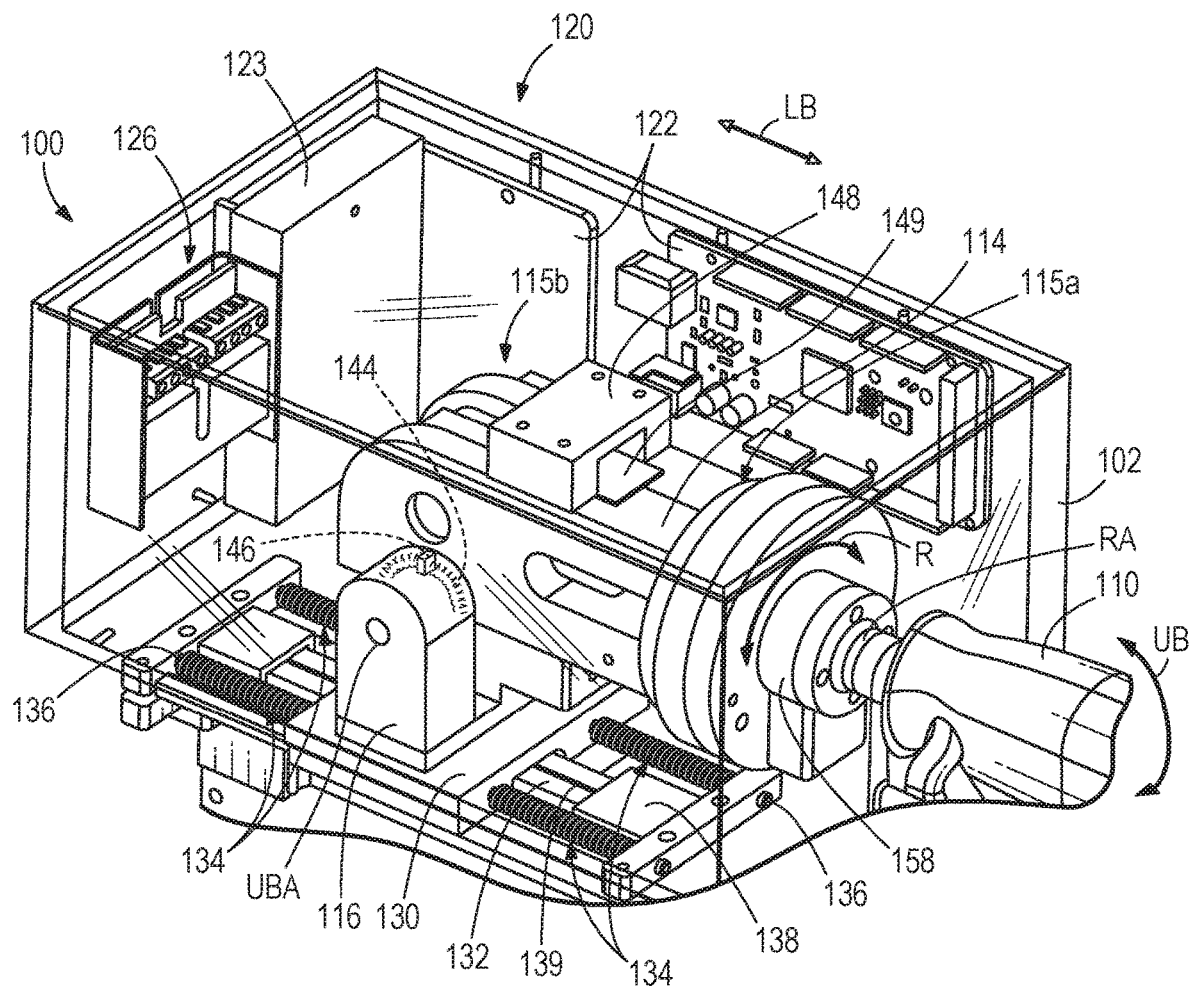
FIGS. 5 and 6 are isometric views depicting one embodiment of the inside of a control head in accordance with the present disclosure.

The control head 100 of FIG. 4 can be seen in more detail in FIG. 5. The embodiment of FIG. 5 depicts the control head 100 as having a transparent control housing 102 such that the inner workings can be seen. However, the control housing 102 may also be opaque, as are those presently known in the art. In the embodiment shown, the joystick 110 is coupled to the first end 115a of a control arm 114 that is substantially linear. The second end 115b of the control arm 114 is pivotally coupled to a control arm mount 116 on a slide carriage 130. The pivotal relationship between the control arm 114 and the control arm mount 116 about a tilt axle UBA allows the joystick 110 to tilt in the upward and downward directions, shown as arrow UB.

The joystick 110 is also rotatable where it is coupled to the control arm 114, specifically via a twist axle RA. This permits rotation of the joystick 110 about the twist axle RA relative to the control arm 114 (and thus rotatable relative to the control head 100) to provide the counterclockwise and clockwise rotation of the joystick 110 designated by arrow R.

The slide carriage 130 is slideably engaged with a slide rail 132. In the embodiment shown, the control housing 102 is fixed relative to the control arm 114 via its connection to the joystick 110, as well as additional support brackets (not shown). In contrast, the slide rail 132 is fixed relative to the valve actuator manifold 200 positioned below (shown in FIG. 4). In this regard, the slide carriage 130, and thus the entire control head 100, is slideable along the slide rail 132. This provides forward and rearward movement of the control head 100 relative to the slide rail 132, and therefore relative to the valve actuator manifold 200 and the hydraulic control manifold 300, thus providing the forward and rearward movement designated as arrow LB.

In the embodiment shown, the slide carriage 130 is constrained to slide along the slide rail 132 by also sliding along a pair of slide centering spring rods 136. This constrains the slide carriage 130 to move only in the forward and rearward directions.

For each of the three direction pairs, the present embodiment also provides automatic centering of the control head 100 to a neutral position in which the aerial bucket 4 is not caused to move via the hydraulic system 3. As shown in FIG. 5, a set of slide centering springs 134 surround and are coaxially aligned with the slide centering spring rods 136, positioned on either side of the slide carriage 130. The slide centering springs 134 bias the slide carriage 130 to the center of the slide rail 132, whereby the bias must be overcome with force exerted by the operator to move the slide carriage 130. In this regard, the slide centering springs 134 are both to automatically center the forward and rearward position of the control head 100, but also to serve as a safety against accidental movement thereof. For example, the slide centering springs 134 may be coupled to the slide carriage 130 via an adjustable screw (not shown), whereby tightening or loosening the adjustable screw increases or decreases the length of the slide centering springs 134 before any force is exerted by the operator.

It should be recognized that other mechanisms for biasing the slide carriage 130, as well as those for constraining motion of the slide carriage 130 relative to the slide rail 132, would be known to one having ordinary skill in the art. Further, certain embodiments in accordance with the present disclosure provide that the biasing forces applied by each of the slide centering springs 134 are adjustable, whereby the amount of force required by the operator to move the joystick 110 in the forward or rearward direction to overcome this bias can be modified based on the user, circumstances of use, equipment, or other unique circumstances.

Similarly, the control arm 114 may be biased to a neutral or center position relative to the control arm mount 116 through the use of a tilt centering spring 144. In one embodiment, the tilt centering spring 144 is positioned within the control arm 114 and engages with a tilt centering pin 146 coupled to the control arm 114. In this regard, pivoting the control arm 114 about the tilt axle UBA compresses and/or extends the tilt centered spring 144 (or both in cases where the tilt centering pin 146 engages the tilt centering spring 144 other than at an end). In the center position, the tilt centering spring 144 biases the control arm 114 such that the centering pin 146, and thus the control arm 114, remains stationary without the application of a user force.

Once again, it should be recognized that other mechanisms for biasing a center position between the control arm 114 and the control arm mount 116 would be known to one having ordinary skill in the art. By way of non-limiting example, these include use of multiple springs, other types of springs, and other biasing devices known in the art. Likewise, the present disclosure anticipates mechanisms whereby this biasing force by the tilt centering spring 144 is adjustable, as previously described with respect to the slide centering springs 134. For example, a torsion spring may be pre-tightened or pre-loosened to modify the biasing force provided. Such an adjustment may be via manual screw, or by electric motor (locally or remotely controlled), for example.

Figure 6:
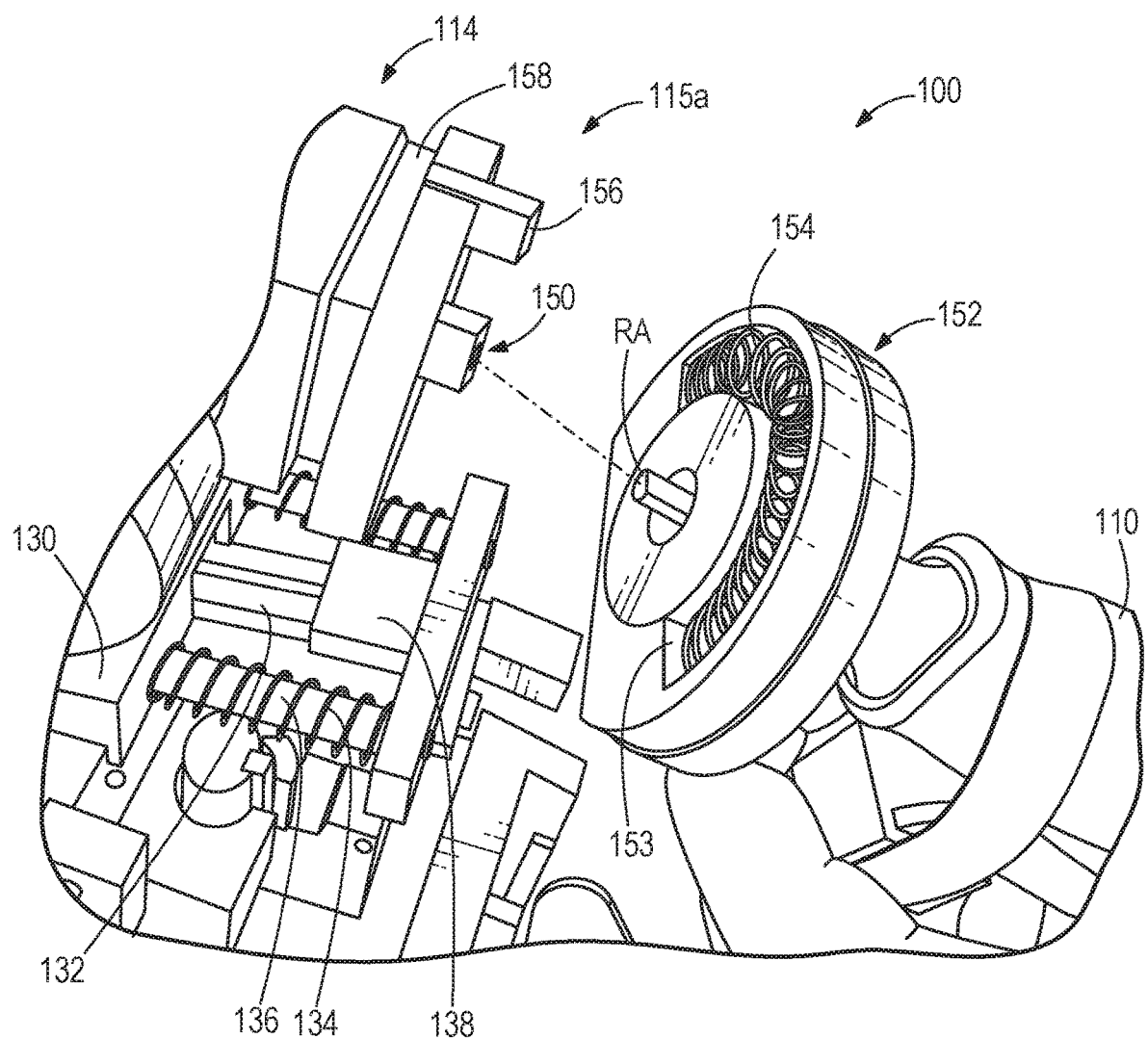

In a similar manner to tilt movements about the tilt axle UBA, twist movements about the twist axle RA are also biased to a center position. The joystick 110 and twist centering spring housing 152 assembly is rotatably coupled to the second end 115B of the control arm 114 through engagement of the twist axle RA into a twist axle receiver 150. In the embodiment shown in FIG. 6, a twist centering spring 154 is retained within a twist centering spring channel 153 defined in a twist centering spring housing 152. The twist centering spring 154 engages with a twist centering pin 156 in the same manner previously discussed with the tilt centering spring 144 and tilt centering pin 146. Consequently, the twist centering spring 154 biases the joystick 110 to the centered position relative to the control arm 114 when the user does not provide a force to overcome this bias. As with the other biasing spring, alterative biasing devices and techniques as would be known to one having ordinary skill in the art.

In addition to each of the three direction pairs having a biased center position (as shown in FIG. 5), each has a corresponding encoder to detect movement in any of these corresponding directions. These encoders may also be referred to as transducers. In the embodiment shown in FIG. 6, a rotational encoder, referred to as twist encoder 158, is provided near the first end 115a of the control arm 114. The twist encoder 158 includes the twist axle RA rotatably extending therefrom, which fixedly engages the twist axle receiver 150. Due to the twist axle RA and twist axle receiver 150 having corresponding D-shaped configurations, rotation of the joystick 110 about the twist axle RA causes rotation within the twist encoder 158 relative to the control arm 114 that is detectable by the twist encoder 158. It should be recognized that other positions for the twist encoder 158 would also provide the necessary function, including integrating it within the control arm 114. While the twist encoder 158 is not expressly shown, any rotation-based transducer known in the art could be incorporated to detect rotation of the joystick 110 in this regard. Furthermore, other types of transducer, including those that are not rotationally-based are anticipated by the present disclosure in configurations providing rotation detection of the joystick 110 relative to the control arm 114. For example, a linear encoder could be coupled to a structure similar to the twist centering pin 146.

Returning to FIG. 5, an encoder similar to the twist encoder 158 previously described is also integrated between the control arm 114 and the control arm mount 116 to detect tilt about the tilt axle UBA. In this embodiment, a tilt encoder 148 is provided along an upper side of the control arm 114, shown substantially near the second end 115b. A tilt tab 149 rests upon the control arm 114, but is not fixed thereto. In certain embodiments, the tilt tab 149 may be directly or indirectly fixed to the slide carriage 130, or otherwise coupled to the control housing 102. In such configurations, the tilt encoder 148 is proximal to the tilt tab 149 and detects the relative position therebetween, whereby tilting the control arm 114 about the tilt axle UBA causes a change in the relative position between the tilt encoder 148 mounted to the control arm 114 and the tilt tab 149. In this manner, the tilt encoder 148 detects movement of the control arm 114 in the upward or downward directions as indicated by the arrow UB. Alternative mechanisms for determining movement would be known to one having ordinary skill in the art, including the use of optical sensors detecting a sliding target, for example.

It should be recognized that alternate configurations for providing a tilt encoder 148, or otherwise detecting movement of the control arm 114 relative to the control arm mount 166 (or relative to the hydraulic control manifold 300 more generally), are fully anticipated by the present disclosure. For example, a rotation-based encoder much like twist encoder 158 could be integrated between the control arm 114 and the control arm mount 116.

It should be recognized the wide variety of encoders anticipated by the present disclosure include both digital and analog devices that are readily available in the market. It should be recognized that the type of encoder (i.e., sliding versus rotating) is, generally, interchangeable depending on modifications to the corresponding mounting structures. In other words, a slide encoder may be mounted to detect rotating movements, as would be known to one having ordinary skill in the art. Accordingly, the names for encoders used herein can generally be read as being interchangeable.

A slide encoder 138 is also provided in a similar manner as the tilt encoder 148 previously discussed. In the embodiment of FIG. 5, the slide encoder 138 detects movement of the slide carriage 130 relative to the slide rail 132. Specifically, a slide tab 139 is coupled to the slide carriage 130 such that the slide tab 139 moves in and out of engagement with the slide encoder 138 when the slide carriage 130 is moved along the slide rail 132. In this manner, the slide encoder 138 can detect motion of the joystick 110 (and specifically, the slide carriage 130) relative to the slide rail 132 to detect movement in the forward and rearward directions indicated by the arrow LB. As with the other encoders, the present disclosure anticipates other mechanisms for detecting this forward and rearward movement of the control head 100 relative to the valve actuator manifold 200.

The slide encoder 138, tilt encoder 148, and twist encoder 158 are each powered by and in communication with electronics module 120 within the control head 100. It should be recognized that while the present embodiment includes the electronics module 120 within the control head 100, it may be located elsewhere, either together or as separated portions. Likewise, communication to and from the electronics module 120 with respect to the slide encoder 138, tilt encoder 148, and twist encoder 158 may be wired, wireless, or a combination thereof, as would be understood by one having ordinary skill in the art. Thus, communication and wiring to, from, and within the electronics module 120 are not explicitly shown for the purpose of clarity.

It should be known that the electronics module 120 as used herein may refer to, be part of, or include an application-specific integrated circuit (ASIC), an electronic circuit, a combinational logic circuit, a field programmable gate array (FPGA), a processor module (shared, dedicated, or group) that executes code, or other suitable components that provide the described functionality, or a combination of some or all of the above, such as in a system-on-chip. The electronics module 120 may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor module. In addition, some or all code to be executed by multiple different processor modules may be stored by a single (shared) memory. The term group, as used above, means that some or all code comprising part of a single module may be executed using a group of processor modules. Likewise, some or all code comprising a single module may be stored using a group of memories.

While the electronics module 120 may be configured in a wide variety of manners, the electronics module 120 of the present embodiment includes a processor module 122 with a processor module battery 123. A battery receiver 124 (shown in FIGS. 7-8) is configured to receive a battery 125, which provides power to a power conversion module 126 to power the electronic power assisted device 1. As shown in FIG. 8, the battery 125 received in the battery receiver 124 is in some embodiments a rechargeable lithium ion battery. This battery 125 may be within the range of 12 to 24 volts DC, such as those commonly used for power tools in the electric power industry (i.e., cordless drills, saws, radios, and others). In this regard, the battery receiver 124 can be configured to accept the same batteries 125 that a given operator also uses for other tools, such as those that cut cable or crimp connectors. This allows an operator to check and easily replace the battery 125 prior to use, swapping in a fresh battery 125 from an array of batteries already present in the truck 2.

Figure 7:
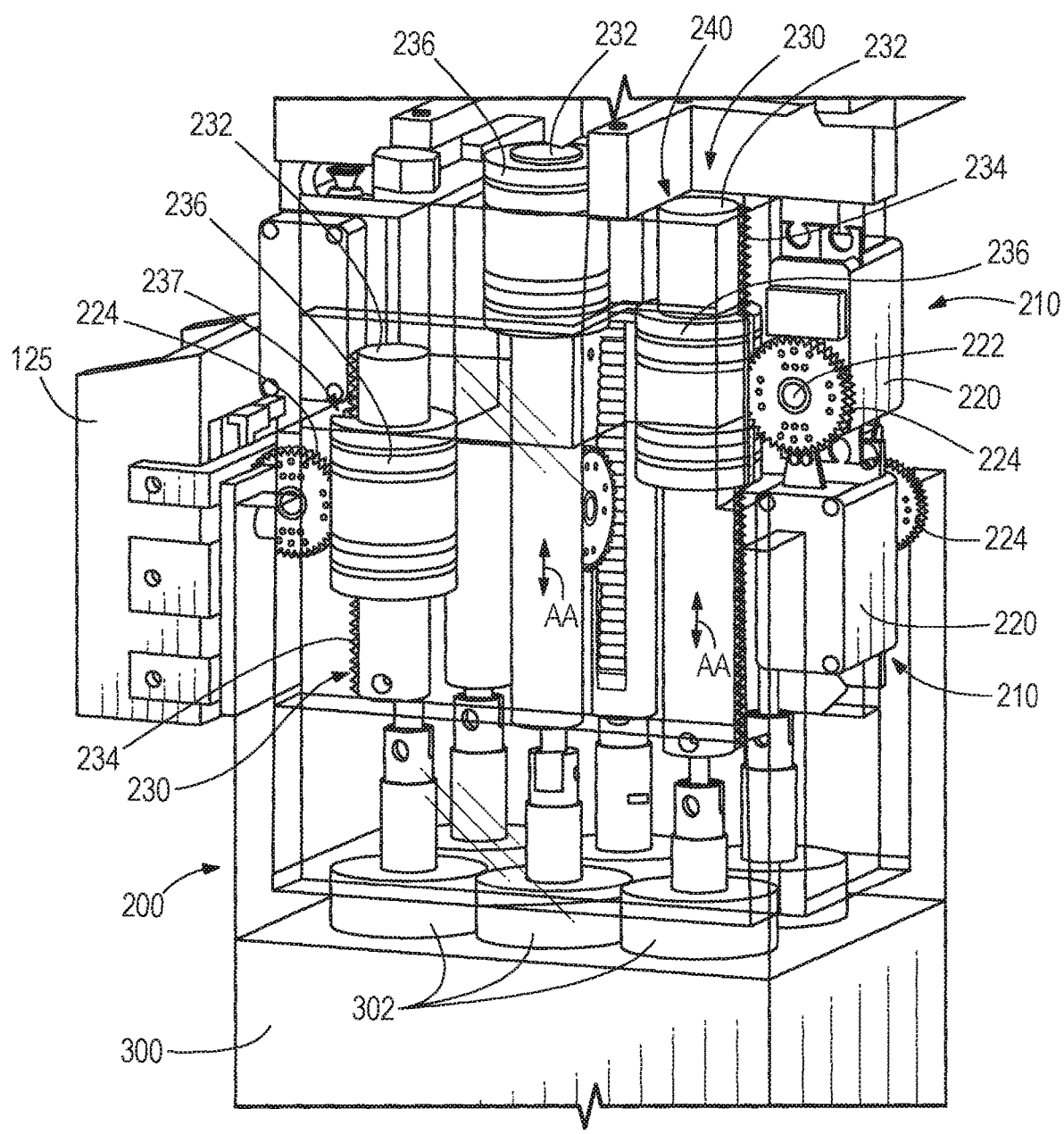
FIG. 7 is an isometric view depicting one embodiment of a linear actuator manifold in accordance with the present disclosure.

Now referring to FIG. 7, in addition to detecting movement of the joystick 110 in each of the three direction pairs, the control head 100 is configured to drive a series of servo drive systems 210 housed within the valve actuator manifold 200. In the embodiment shown, the voltage from the battery 125 is stepped down to a 5 volt signal that can be modulated with the processor module 122. The processor module 122 controls the positions of the valves 302 based on the detected position of the control head 100 as moved by the joystick 110. In the embodiment shown, the processor module 122 controls operation of six high-torque DC motors within the servo drive systems 210, the motors being shown as servo motors 220. These six servo motors 220 correspond to the six valves 302 presently shown in the poppet valve style of hydraulic control manifold 300, though other configurations could also be incorporated. In other embodiments, one servo motor 220 moves multiple valves 302 (depending upon the setup of the hydraulic control manifold 300), or multiple servo motors 220 may move a single valve 302. For example, three servo motors 220 can be used to control the valves 302 in a spool valve style of hydraulic control manifold. Each of the servo drive systems 210 in the present embodiment includes one servo motor 220 that rotates a pinion 224 onto its driveshaft 222.

Figure 12:
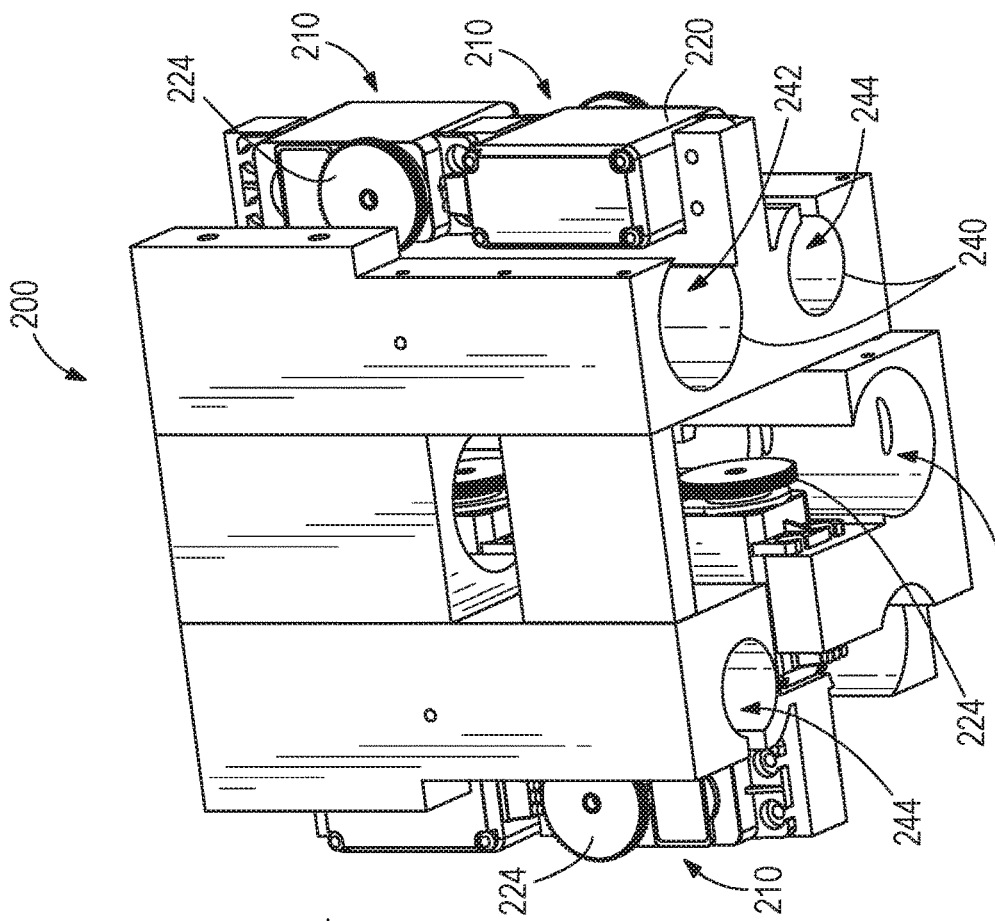
FIGS. 11 and 12 depict top-side and bottom-side isometric views of one embodiment of linear actuator in accordance with the present disclosure.
Figure 11:
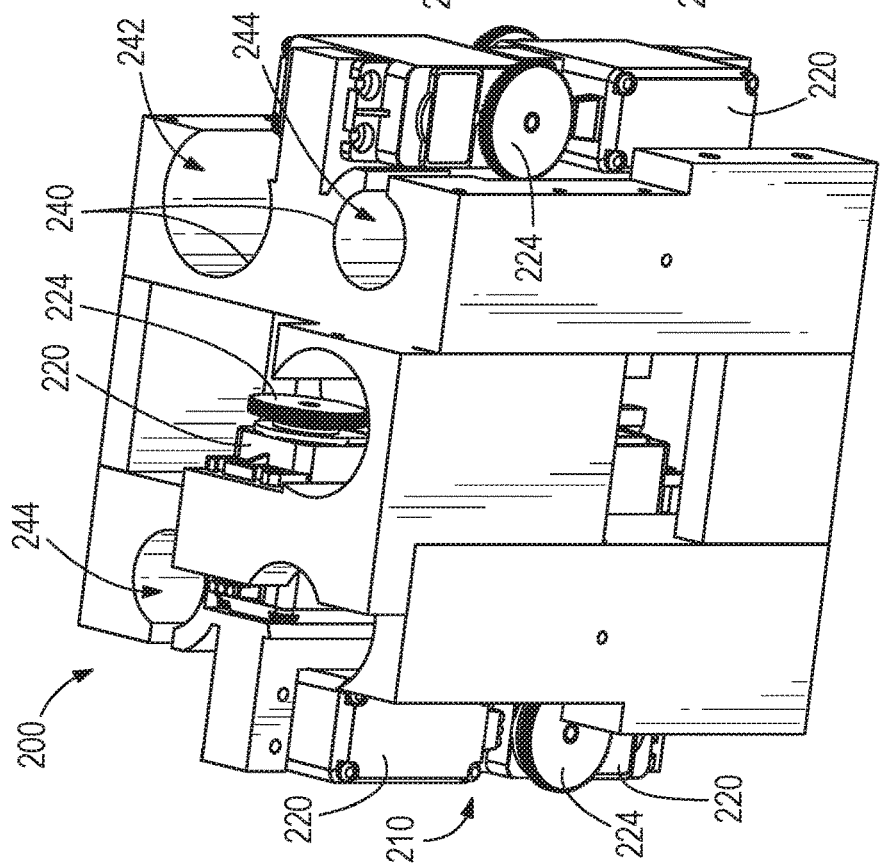
Figure 13:
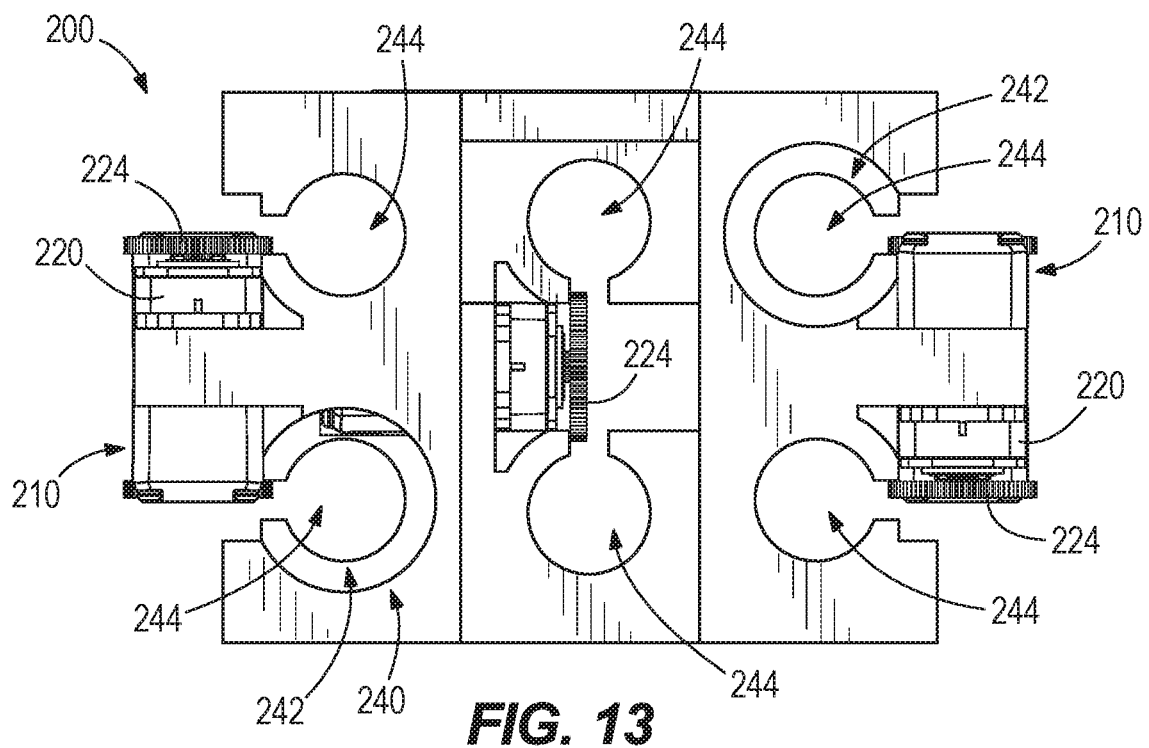
FIG. 13 is a top view of the linear actuator shown in FIGS. 11 and 12.
Figure 14:
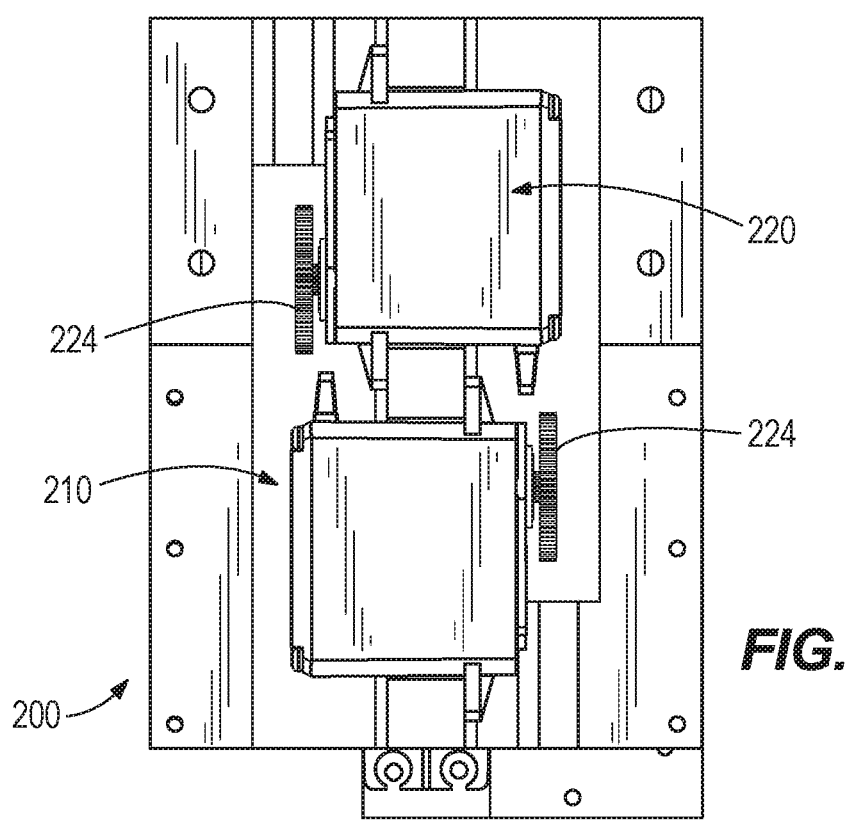
FIG. 14 is a back view of the linear actuator shown in FIGS. 11 and 12.

The valve actuator manifold 200 further includes a plurality of actuator bores 240 each comprising a bearing bore 242 and an actuator rod bore 244. As shown in FIGS. 11-13, the bearing bore 242 and actuator rod bore 244 of a given actuator bore 240 are coaxial, whereby the bearing bore 242 has a larger diameter than the actuator rod bore 244. As shown in FIG. 7, each actuator bore 240 retains a bearing 236 within the bearing bore 242, as well as an actuator rod 232 that is axially slideable within the actuator rod bore 244 (and bearing 236). Each actuator rod 232 includes a rack 234 coupled thereto, and each bearing 236 correspondingly includes a rack cutout 237. In this manner, the actuator rod 232 is permitted to slide within the bearing 236, whereby the rack 234 moves within the rack cutout 237 so as to not restrict movement therebetween.

While each actuator rod 232 is moveable within the actuator bore 240, the lower end of each actuator rod 232 is coupled to a corresponding valve 302. In this manner, movement of an actuator rod 232 causes movement of its corresponding valve 302. As can be seen in FIG. 7, the pinion 224 couples and rotates with servo motor 220 of each servo drive system 210 by a driveshaft 222. Each pinion 224 engages with the rack 234 on the actuator rod 232 of the valve actuator 230 corresponding to that same servo drive system 210. As previously stated, each servo motor 220 is operable by commands from the processor module 122, which arises through detected movements of the joystick 110. In this regard, movement of the servo motor 220 causes the corresponding valve actuator 230 to slide upward or downward, causing corresponding movement of the corresponding valve 302. Accordingly, movement of the joystick 110 is detected by one or more of the slide encoder 138, tilt encoder 148, and twist encoder 158 to produce corresponding movement of the servo motors 220, thereby moving the valves 302 within the hydraulic control manifold 300. As with conventional aerial bucket systems known in the art, this correspondingly moves the aerial bucket 4.

It should be recognized that other configurations of valve actuators 230 are also anticipated by the present disclosure. As non-limiting examples, these include threaded actuator rods driven by a servo motor, solenoid-driven actuator rods, or actuator rods that do not move exclusively parallel to the valve 302 movement (such as a scissors-lift type movement).

As will be readily recognized, the particular valves 302 to be moved in response to the detected movement of the joystick 110 are controlled by the processor module 122. The electronics module 120 and programs contained within the processor module 122 permit the presently disclosed device to be configured to retrofit existing control heads, replacing the mechanical linkages with encoders and servo drive systems. While not expressly labeled, the program may be stored within a non-transitory memory module within the electronics module 120 that is in communication with the processor module 122 in the conventional manner known in the art.

In this regard, the presently disclosed devices and methods replace the purely-mechanical movement of the hydraulic control manifold with electronic-assisted movements. Consequently, the presently disclosed devices and methods not only permit a reduction in the amount of user force FI required to produce the necessary hydraulic control force FO to operate valves 302 known in the art (see FIGS. 2A and 2B), but allow this required user force FI to be fully-adjustable. In other words, the presently disclosed device is configurable such that an infinitesimally small user force FI can trigger a great force to be produced by the servo drive systems 210 that is sufficient to move the valves 302.

However, the present applicants have identified that it is often advantageous to require a minimal threshold of user force FI on the joystick 110 before providing corresponding movement of the aerial bucket 4. This minimum threshold serves both as a safety precaution to prevent accidental movement, and also to provide some level of tactile feedback to the operator during use. Accordingly, the speed and force of each servo drive system 210 is fully configurable with the processor module 122. Likewise, the amount of bias required to be overcome by the user is adjustable through selection and configuration of the slide centering spring 134, tilt centering spring 144, and twist centering spring 154, as previously discussed. In some embodiments, these bias forces are also adjustable, whether on the fly by the operator from the aerial bucket, through manufacturer settings, or by equipment management personnel either in person or through remote connection to the electronics module 120. For example, additional servo motors in communication with the electronics module 120 could pre-tension (or release) any of these bias devices.

The presently disclosed devices and methods thereby provide substantial ergonomic improvements for operating equipment incorporating a hydraulic control manifold 300 presently known in the art. By using a simple rechargeable lithium ion battery, or other power sources in the art, the necessary hydraulic control force FO can be provided by the disclosed servo drive systems 210, rather than fatiguing forearm muscles of operators or possibly exposing operators to repetitive stress injuries.

Furthermore, as previously stated, the presently disclosed devices and methods can be retrofitted into existing aerial bucket configurations by simply attaching the device to the hydraulic control manifold 300 in the aerial bucket 4 with four bolts. As such, a company using such trucks 2 can easily incorporate the present device as an ergonomic—and also economic—improvement to existing hardware without substantial investment in new equipment.

Similarly, due to the electronic-nature of the presently disclosed device, various analytics can be shared from the electronics module 120 to the operator or personnel in charge of managing the operators and/or the trucks 2. Specifically, the electronics module 120 may include such features as battery level monitors. However, these features may be further expanded to include preventative maintenance tracking for other components of the hydraulic system 3, including service hours and predictive preventive maintenance. Likewise, the electronics module 120 further permit those with management privileges to adjust the speed or other operating characteristics of the servo drive systems 210 in relation to a specific operator, a group of operators, or a particular use for the aerial bucket 4. This may be advantageous in configuring a single truck 2 to operate across a wide variety of industries and needs.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references may be made herein. The cited references are incorporated by reference herein in their entireties. In the event that there is an inconsistency between a definition of a term in the specification as compared to a definition of the term in a cited reference, the term should be interpreted based on the definition in the specification.

We claim:

1. A device for controlling movement of an aerial bucket via a hydraulic system, the hydraulic system having a hydraulic control manifold with a plurality of valves, wherein controlling movement of the plurality of valves controls movement of the aerial bucket, the device comprising:
a control head having a joystick, the joystick being moveable, and the control head having a plurality of encoders that detect movement of the joystick;
a valve actuator manifold operatively coupled between the control head and the hydraulic control manifold;
a plurality of valve actuators supported by the valve actuator manifold that are coupled to the plurality of valves and moveable to control movement of the plurality of valves;
a plurality of servo drive systems supported by the valve actuator manifold that are coupled to the plurality of valve actuators and are controllable to move the plurality of valve actuators; and
a processor module in communication with the plurality of encoders and the plurality of servo drive systems, wherein the processor module controls the plurality of servo drive systems based on input received from the plurality of encoders such that moving the joystick causes one or more of the plurality of servo drive systems to move one or more of the valve actuators to control movement of the aerial bucket.

2. The device according to claim 1, wherein the joystick is moveable in forward and rearward directions, in upward and downward directions, and in clockwise and counterclockwise directions, each being detectable by the plurality of encoders.

3. The device according to claim 1, wherein a given servo drive system in the plurality of servo drive systems includes a servo motor with a pinion rotatably coupled thereto, wherein a given valve actuator of the plurality of valve actuators includes an actuator rod with a rack coupled thereto, and wherein the rack and the pinion are meshed such that the given valve actuator is movable by the given servo drive system.

4. The device according to claim 1, wherein the joystick is configured to receive a user force from a user, wherein the plurality of servo drive systems together produce a hydraulic control force on the plurality of valves, and wherein the hydraulic control force produced by the plurality of servo drive systems exceeds the user force.

5. The device according to claim 1, wherein the joystick has a centered position, further comprising a plurality of bias devices that resist movement of the joystick from the centered position.

6. The device according to claim 5, wherein the valves are moveable along an actuator axis, wherein the control head has a control housing, and wherein the joystick is substantially linear and extends away from the control housing perpendicular to the actuator axis when the joystick is in the centered position.

7. The device according to claim 1, further comprising a battery receiver configured to receive a battery to provide electrical power to the plurality of servo drive systems.

8. The device according to claim 1, wherein the plurality of valve actuators are each substantially linear and extend along an actuator axis, and wherein movement of the plurality of actuators by the plurality of servo drive systems is along the actuator axis.

9. A hydraulic system comprising the device of claim 1.

10. An aerial bucket system comprising the device of claim 1.

11. A device for controlling movement of an aerial bucket via a hydraulic system, the hydraulic system having a hydraulic control manifold with a plurality of valves, wherein controlling movement of the plurality of valves controls movement of the aerial bucket, the device comprising:
a control head having a joystick, the joystick being moveable, and the control head having a plurality of encoders that detect movement of the joystick;
a valve actuator manifold operatively coupled between the control head and the hydraulic control manifold;
a plurality of valve actuators supported by the valve actuator manifold that are coupled to the plurality of valves and moveable to control movement of the plurality of valves;
a plurality of servo drive systems supported by the valve actuator manifold that are coupled to the plurality of valve actuators and are controllable to move the plurality of valve actuators; and
a processor module in communication with the plurality of encoders and the plurality of servo drive systems, wherein the processor module controls the plurality of servo drive systems based on input received from the plurality of encoders such that moving the joystick controls movement of the aerial bucket;
wherein the control head includes a carriage that is slideably engaged with a rail such that the joystick is moveable in forward and rearward directions, wherein movement of the carriage is perpendicular to movement of the plurality of valve actuators, and wherein the plurality of encoders includes a slide encoder to detect movement of the joystick in the forward and rearward directions.

12. The device according to claim 11, further comprising a control arm having a first end and a second end opposite the first end, wherein the first end is coupled to the joystick and the second end is pivotably coupled to the carriage such that the joystick is moveable in upward and downward directions, and wherein the plurality of encoders includes a tilt encoder to detect movement of the joystick in the upward and downward directions.

13. The device according to claim 11, further comprising a control arm having a first end and a second end opposite the first end, wherein the first end is rotatably coupled to the joystick about a twist axis, wherein the second end is coupled to the carriage, wherein the joystick rotates about the twist axis such that the joystick is moveable in clockwise and counterclockwise directions, and wherein the plurality of encoders includes a twist encoder to detect movement of the joystick in the clockwise and counterclockwise directions.

14. A method for controlling movement of an aerial bucket via a hydraulic system, the hydraulic system having a hydraulic control manifold with a plurality of valves, wherein controlling movement of the plurality of valves controls the aerial bucket, the method comprising:
coupling a valve actuator manifold to the hydraulic control manifold, the valve actuator manifold supporting a plurality of valve actuators;
coupling the plurality of valve actuators to the plurality of valves, wherein the plurality of valve actuators are moveable to control movement of the plurality of valves;
coupling a plurality of servo drive systems to the plurality of valve actuators, wherein the plurality of servo drive systems are controllable to move the plurality of valve actuators;
coupling a control head to the valve actuator manifold, wherein the control head has a joystick that is moveable, and wherein the control head has a plurality of encoders that detect movement of the joystick; and
connecting a processor module to the plurality of encoders and to the plurality of servo drive systems, wherein the processor module controls the plurality of servo drive systems based on input received from the plurality of encoders such that moving the joystick causes one or more of the plurality of servo drive systems to move one or more of the valve actuators to control movement of the aerial bucket.

15. The method according to claim 14, wherein the control head includes a carriage that is slideably engaged with a rail such that the joystick is moveable in forward and rearward directions, wherein movement of the carriage is perpendicular to movement of the plurality of valve actuators, further comprising a control arm having a first end and a second end opposite the first end, wherein the first end is rotatably coupled to the joystick about a twist axis and the second end is pivotably coupled to the carriage, wherein the joystick is rotatable about the twist axis such that the joystick is moveable in clockwise and counterclockwise directions, and wherein the second end is pivotable relative to the carriage such that the joystick is moveable in upward and downward directions.

16. The method according to claim 14, wherein the joystick has a centered position, further comprising a plurality of bias devices that resist movement of the joystick from the centered position.

17. The method according to claim 14, further comprising coupling a battery receiver to the plurality of servo drive systems, wherein the battery receiver is configured to receive a battery to provide electrical power to the plurality of servo drive systems.

18. A method for controlling movement of an aerial bucket via a hydraulic system, the hydraulic system having a hydraulic control manifold with a plurality of valves, wherein controlling movement of the plurality of valves controls the aerial bucket, the method comprising:
coupling a valve actuator manifold to the hydraulic control manifold, the valve actuator manifold supporting a plurality of valve actuators;
coupling the plurality of valve actuators to the plurality of valves, wherein the plurality of valve actuators are moveable to control movement of the plurality of valves;
coupling a plurality of servo drive systems to the plurality of valve actuators, wherein the plurality of servo drive systems are controllable to move the plurality of valve actuators;
coupling a control head to the valve actuator manifold, wherein the control head has a joystick that is moveable, and wherein the control head has a plurality of encoders that detect movement of the joystick; and
connecting a processor module to the plurality of encoders and to the plurality of servo drive systems, wherein the processor module controls the plurality of servo drive systems based on input received from the plurality of encoders such that moving the joystick controls movement of the aerial bucket;
wherein a given servo drive system in the plurality of servo drive systems includes a servo motor with a pinion rotatably coupled thereto, wherein a given valve actuator of the plurality of valve actuators includes an actuator rod with a rack coupled thereto, wherein the rack and the pinion are meshed such that the given valve actuator is movable by the given servo drive system, and wherein the joystick is configured to receive a user force from a user, wherein the plurality of servo drive systems together produce a hydraulic control force on the plurality of valves, wherein the hydraulic control force produced by the plurality of servo drive systems exceeds the user force.

19. The method according to claim 18, further comprising configuring the processing module to move the plurality of valve actuators a given distance based on a given movement of the joystick, wherein the given distance is adjustable.

20. A device to control an aerial bucket having a hydraulic system, the hydraulic system having a hydraulic control manifold with a plurality of valves, wherein controlling the plurality of valves controls the aerial bucket, the device comprising:
a control head having a joystick, wherein the control head includes a carriage that is slideably engaged with a rail such that the joystick is moveable in forward and rearward directions, wherein movement of the carriage is perpendicular to movement of the plurality of valve actuators, further comprising a control arm having a first end and a second end opposite the first end, wherein the first end is rotatably coupled to the joystick about a twist axis and the second end is pivotably coupled to the carriage, wherein the joystick is rotatable about the twist axis such that the joystick is moveable in clockwise and counterclockwise directions, wherein the second end is pivotable relative to the carriage such that the joystick is moveable in upward and downward directions, and wherein the joystick has a centered position, further comprising a plurality of bias devices that resist movement of the joystick from the centered position;
a valve actuator manifold operatively coupled between the control head and the hydraulic control manifold;
a plurality of valve actuators within the valve actuator manifold that are coupled to the plurality of valves and moveable to control the plurality of valves;
a plurality of servo drive systems within the valve actuator manifold that are coupled to the plurality of valve actuators and controllable to move the plurality of valve actuators, each of the plurality of valve actuators having an actuator rod with a rack coupled thereto, each of the plurality of servo drive systems having a servo motor rotatably coupled to a pinion, the rack and the pinion being configured to mesh such that the plurality of servo drive systems cause movement of the plurality of valve actuators;

a battery receiver configured to receive a battery to provide electrical power to the plurality of servo motors; and a processor module in communication with the plurality of encoders and the plurality of servo drive systems, wherein the joystick is configured to receive a user force from a user, wherein the user force causes movement of the joystick that is detectable by the plurality of encoders, wherein the processor module controls the plurality of servo drive systems to produce a hydraulic control force on the plurality of valves, wherein the processor module controls the plurality of servo drive systems based on input received from the plurality of encoders;

wherein the hydraulic control force produced by the plurality of servo drive systems exceeds the user force from the user.

* * * * *